United States Patent [19]

Ohnhaus

[11] Patent Number: 4,619,138
[45] Date of Patent: Oct. 28, 1986

[54] AIRFLOW MEASUREMENT SHROUD

[76] Inventor: Buford Ohnhaus, 9925 Lorelei NE., Albuquerque, N. Mex. 87111

[21] Appl. No.: 683,403

[22] Filed: Dec. 19, 1984

[51] Int. Cl.$^4$ ............................................. G01F 15/00
[52] U.S. Cl. ....................................... 73/198; 138/37
[58] Field of Search ................ 73/861.63, 861.68, 198; 138/37, 39

[56] References Cited

U.S. PATENT DOCUMENTS

| | | | |
|---|---|---|---|
| 3,733,898 | 5/1973 | Yamamoto et al. | 138/39 |
| 3,733,900 | 5/1973 | De Baum | 73/861.66 |
| 4,231,253 | 11/1980 | Ohnhaus et al. | 73/861.62 |

Primary Examiner—Herbert Goldstein
Attorney, Agent, or Firm—Frishauf, Holtz, Goodman & Woodward

[57] ABSTRACT

A length of duct is provided for seating a portable airflow meter so that when the end of the duct away from the airflow meter is put over a part of a ventilation opening, airflow can be measured in a manner not subject to substantial errors from the presence of jets or eddies in the flow of air out of the ventilation opening. The lower part of the shroud has a flat, perforated baffle plate disposed horizontally near the bottom in the center of the duct and at a distance farther towards the middle of the duct, and evenly spaced set of downwardly pointing triangles extending obliquely from the respective middles of the duct wall and a more numerous set of upwardly extending oblique members having the shape of short angle bars, tapering slightly. Facing the front and back of the airflow meter are cutouts in the upper end of the shroud so that measurements of air flowing into the ventilation opening will be equivalent of those that would be made without the shroud.

7 Claims, 6 Drawing Figures

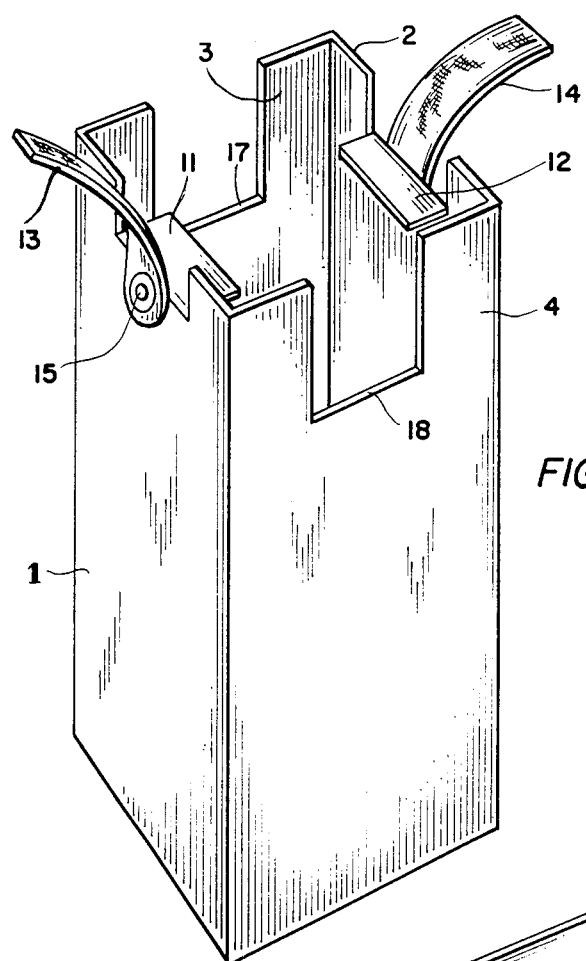
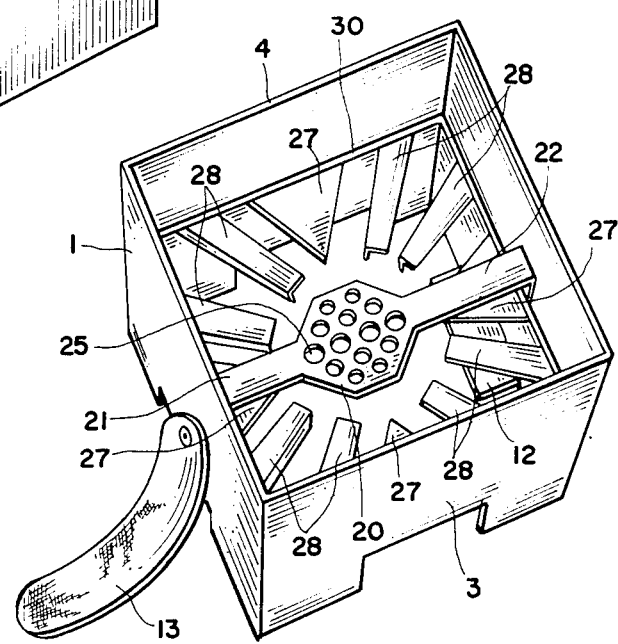
FIG. 1
FIG. 2

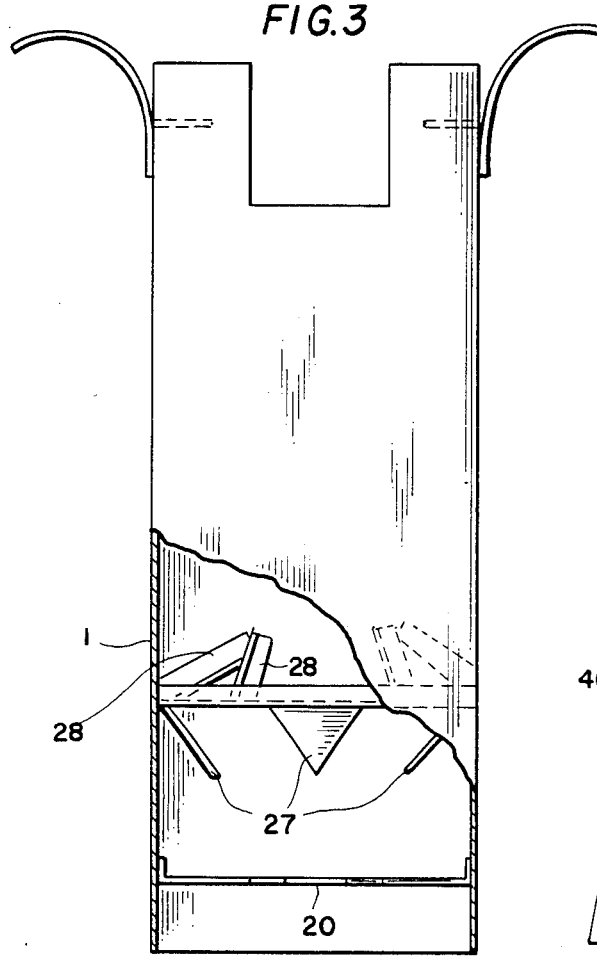
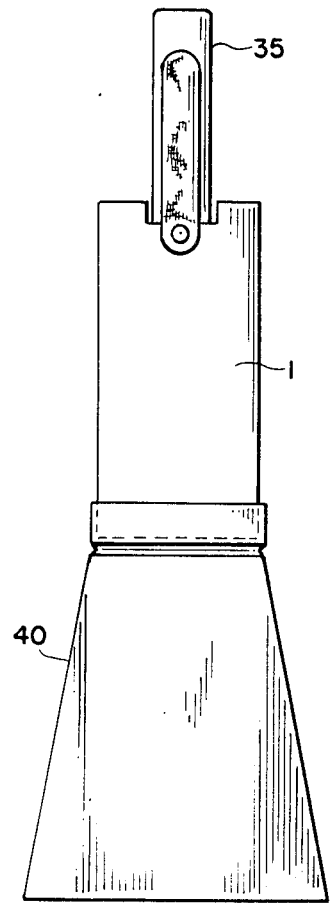
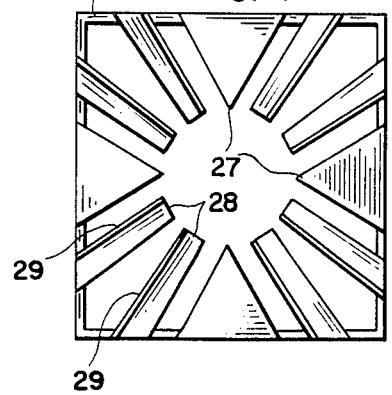
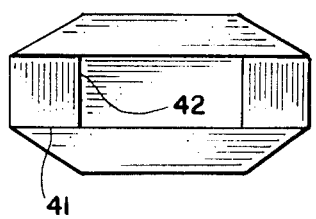

AIRFLOW MEASUREMENT SHROUD

This invention concerns a shroud, a short piece of airflow duct, for improving the accuracy of a conventional airflow meter when interposed between the meter and the outlet of a ventilation duct.

It is important in the ventilation of buildings, especially when a ventilation system is used also to carry heat to or remove heat from rooms and corridors, to adjust the airflow into and out of various ventilated spaces in order to avoid waste of power in ventilation and/or in heating or air-conditioning, while at the same time also avoiding insufficiency of ventilation, heating or air-conditioning in any part of the building. In order that the appropriate adjustments may be made it is important, therefore, to measure the amount of flow through various ventilation system outlets or registers before and after adjustment.

In a major ventilation system balancing operation, such as would take place when the system is installed, for example, rather large devices, such as the air-flow capture and control device for flow measurement illustrated in U.S. Pat. No. 4,231,253 are used which are in the form of a large box with an adjustable aperture, a mounting for the air-flow probe of a measuring instrument in the aperture and of course an open end opposite the adjustable aperture so that the whole device can fit over an opening in a wall, ceiling or floor. After a system is installed, however, checking for obstructions or accommodating small changes is often done with much more easily portable instruments, for example placing an airflow meter, such as the Alnor Jr. velocity meter type 8100, which has a rather narrow rectangular case and has an airflow measuring orifice at the bottom, on top of the grating of a ventilation opening with its orifice facing into the ventilation duct. The difficulty in such cases is that the airflow out of the opening may have jets of air at particular places or other non-uniformities, with the result that it is difficult to obtain a measurement representative of the rate of airflow through the opening as a whole.

SUMMARY OF THE INVENTION

It is an object of the present invention to provide a shroud which may be fastened to an airflow meter of the kind just mentioned so that air flowing out of the ventilation opening will be made to flow (after it comes out of the shroud) with a more uniform cross-sectional velocity profile by the time it reaches the airflow meter. It is a further object of the invention that the shroud should not have to be removed for making measurements of the kind that could be made with the airflow meter alone for measurement of airflow into the ventilation opening. In the latter case the shroud merely guides suction from the ventilation intake upstream to the downstream side of the flow meter.

Briefly, a substantially straight length of duct open at both ends is provided, at one end, with means for seating and holding a portable airflow meter so that it bridges the duct with a metering aperture, normally centrally located the inlet orifice at the duct end. Baffles are provided, preferably in the lower half of the duct section for breaking up jets, vortices and eddies in the airflow. A first baffle near the bottom of the shroud is in the form of a plate having several apertures therethrough and held so that it covers an area centered on the axis of the duct which is not more than one-ninth nor less than one twenth-fifth of the cross-section of the duct. Second and third baffles both leave open a central cross-sectional area in the duct and are made up of members projecting from the duct wall obliquely towards the axis of the duct. The members of the second baffle extend obliquely towards the bottom of the duct and, in the event that the duct is square or rectangular, as is preferred, these baffle members are preferably located respectively in the middle regions of the four duct walls and are flat plates tapering down to a point as they extend obliquely towards the duct axis. The members of the third baffle extend obliquely upwards and extend from portions of the duct that are chosen so that they will encounter air that flows between the members of the second baffle. The members of the second and third baffles may be mounted on a common supporting rim fastened to the duct wall. The members of the third baffle are preferably shaped like angle bars, so that they will have one flat surface forcing the oncoming flow to divide around each member and a substantially vertical surface for opposing any whirling flow in the duct.

In order to avoid changing the characteristic of the airflow meter when measurements of air flowing into the ventilation opening are made, cutouts are provided at the meterseating end of the shroud, at opposite sides thereof, disposed so that the cutouts are as far away from the body of the flow meter as possible.

It is convenient to provide an auxiliary transition duct for use with the shroud at the end thereof facing the ventilation opening so as to provide a transition from a narrow rectangular opening of the same area as the duct cross-section to the duct cross-section which is preferably square.

BRIEF DESCRIPTION OF THE DRAWINGS

The invention is further described by way of illustrative example with reference to the annexed drawings, in which:

FIG. 1 is a perspective view of an airflow shroud according to the invention in its normal position for use in measuring airflow coming out of a horizontal grate;

FIG. 2 is a perspective view of the shroud of FIG. 1 turned upside down and viewed at a more steeply vertical angle than FIG. 1;

FIG. 3 is a side elevation, partly in section, resulting from breaking away part of the lower duct wall, of the airflow shroud of FIG. 1;

FIG. 4 is a top view of a unit carrying the upwardly oblique and downwardly oblique baffle members in the shroud of FIG. 1;

FIG. 5 is a side elevation of the shroud of FIG. 3, on a reduced scale and viewed at right angles to the view given in FIG. 3, with an airflow meter in place at the top and with an adaptor duct in place at the bottom, and FIG. 6 is a bottom view of the adaptor duct shown in FIG. 5.

DESCRIPTION OF THE ILLUSTRATED EMBODIMENT

FIGS. 1 and 2 are perspective top and bottom views, and FIG. 3 is a side elevation, partly in section, of an airflow shroud according to the invention. The embodiment illustrated in these figures utilizes a length of duct of square cross-section, which may be made of metal, such as a sheet of aluminum of the thickness commonly used for air ducts, or of plastic, cardboard or other stiff material, measuring for instance about 9 cm on a side and about 22 cm in length.

On opposite walls 1 and 2 of the shroud, near the top, there extend inwards brackets 11 and 12 for support of an airflow meter of a conventional rectangular type. Above the brackets 11 and 12, the walls 1 and 2 are cut out so that a meter which would more than bridge the duct can be accommodated. Strips 13 and 14 of hooking fabric for firmly holding a complementary fabric bonded or fastened on the meter are held on the walls 1 and 2 just below the brackets 11 and 12, in the illustrated case by rivets, such as the rivet 15.

Cutouts 17 and 18 are provided in the walls 3 and 4, so that when the airflow meter (not shown) is used to measure air flowing into a ventilation opening through the illustrated shroud, the readings on the airflow meter, when used to measure flow of air into the shroud will be the same as if the shroud were not used.

FIG. 5 shows a view of the shroud of FIG. 1 directly from the left side of the shroud shown in FIG. 1, with an airflow meter 35 mounted in place and held by the hooked fabric strips, the strip 13 being visible in the drawing. FIG. 5 also shows an optional device added below the shroud of FIG. 1 which will be described later.

The purpose of the shroud of FIG. 1 is not merely to cause the airflow to be measured to pass through a length of duct, but rather to process the airflow by elements enclosed in the lower part of the duct and shown in FIG. 2 which is a bottom view. These elements also appear in FIG. 3 where the wall 4 of the shroud has been broken away, to reveal the baffle structures also shown in FIG. 2. The sectioning in FIG. 3 is such as would be produced by simply cutting away the wall 4 for part of the length of its corners with the walls 1 and 2 of the square duct section.

Near the bottom of the shroud is located a baffle plate 20 which is made integral with the strips 21 and 22 by which it is supported on the walls 1 and 2 of the duct. In the illustrated case, the strips 21 and 22 are shown as bent over for bonding to the walls 1 and 2, but of course they could be sprung into slots or otherwise fixed in place.

The baffle plate 20 is provided with a number of apertures 25 through which air can flow. As already mentioned, these apertures provide at least 30% open area, and the baffle in this place has an area, including the aperture areas, that is in this case visibly less than one-ninth the cross-sectional area of the duct.

Both the downwardly oblique triangular baffles 27 and the upwardly oblique members 28 are fastened on a common base strip 30 which has a flange lying flush against the walls of the duct for bonding thereto by adhesive or other fastening means.

FIG. 4 shows the insert carrying the baffle members 27 and 28 and shows also the upturned vertical surfaces 29 of the baffle members 28 somewhat better than can be done in the other views.

Thus when an airflow meter 35 is mounted on the brackets 11 and 12 and fastened in place by the strips 13 and 14, the shroud illustrated in FIG. 1 can be simply placed over a horizontal ventilation opening in the attitude shown in FIGS. 1, 3 and 5, and the meter will show a reliable velocity measurement for the air flowing into the bottom of the shroud because of the effect of the baffle plate 20 and the baffle members 27 and 28 breaking up jets and eddies that might otherwise adversely affect the readings of the meter. The square cross-section of the shroud is preferred because most ventilation ducts are rectangular and measurements can be taken at various places with a square shroud of the kind shown. If it is desired to measure the airflow in longer and narrower strips, an adaptor such as shown in FIGS. 5 and 6 can be used. FIG. 5 shows a horn 40 for providing a transition passage for air between a long, narrow aperture 41 shown at the bottom in FIG. 5 and a square aperture 42 matching the shroud of FIG. 1. Both the elongated aperture 41 and the square aperture 42 have the same area.

The shroud of FIG. 1 with or without the horn 40 shown in FIG. 5 can also be used for measuring airflow at vertical ventilation apertures or ceiling apertures, but in those cases it will need to be held against the aperture instead of simply resting on it by gravity.

Experience has been shown that measurements with an airflow meter utilizing a shroud such as herein described have improved reliability because of absence of disturbing effects from jets or turbulences in the flow of air from a ventilation opening.

Although the invention has been described by way of illustrative example, it will be recognized that modifications and variations are possible within the inventive concept.

I claim:

1. Airflow measurement shroud comprising:
   a substantially straight length of duct having imperforate wall means open at both ends and having a central axis;
   means for seating and holding a portable airflow meter at a first end of said duct length in a position crossing the center of the cross-section of said duct, said meter having at least one measurement orifice, said position exposing a measurement orifice of said meter near said center of said cross-section;
   end cutouts on opposite sides of said duct at said first end of said duct length, facing each other across said duct in a direction transverse to the seating of said airflow meter across said duct;
   a central first baffle substantially perpendicular to said duct axis for breaking up central airflow jets, said first baffle having at least three apertures therethrough providing at least 30% open area, said baffle covering not more than one-ninth nor less than one-twenty-fifth of the cross-section of said duct and supported on said duct wall means so as to be located within said duct in the neighborhood of a second end of said duct length which is the opposite end thereof with respect to said first end thereof;
   a multimember second baffle leaving open a central cross sectional area in said duct, located between said first baffle and said means for seating and holding said airflow meter, having members at fixed locations on said wall means substantially on a plane transverse to said axis distributed around said wall means and extending obliquely towards said axis with a component of direction towards said first baffle; and
   a third multimember baffle leaving open a central cross-sectional area in said duct, located between said first baffle and said means for seating and holding said airflow meter, having members fixed at locations on said wall means substantially on a lane transverse to said axis distributed around said wall means and extending obliquely towards said axis with a component of direction towards said means for seating said airflow meter.

2. Airflow measurement shroud according to claim 1, in which said members of said second baffle when viewed in a direction parallel to said axis, occupy cross-sectional areas which are not occupied by said members of said third baffle.

3. Airflow measurement shroud according to claim 1, in which said members of said second and third baffles are fixed at locations on said wall means by a common affixing structure and when viewed in a direction parallel to said axis, said members of said second baffle and said members of said third baffle are regularly interleaved around said wall means.

4. Airflow measurement shroud according to claim 1, in which said members of said second baffle are flat members having a broad base adjacent to said wall means and tapering in width toward an extremity, and said members of said third baffle are elongated angle-bar-shape members having one oblique part disposed in a plane substantially parallel to said axis and another oblique part at approximately right angles thereto.

5. Airflow measurement shroud according to claim 1, in which said duct length is of substantially rectangular cross-section.

6. Airflow measurement shroud according to claim 5, in which said duct length is of substantially square cross-section.

7. Airflow measurement shroud according to claim 4, in which said duct length is of substantially square cross-section and in which said members of said second baffle are four in number and substantially centally located on the respective flat walls of duct wall means, and in which said members of said third baffle are eight in number, two of them being located between each two of said members of said second baffle.

* * * * *